Figures 1, 2, 3, 4:
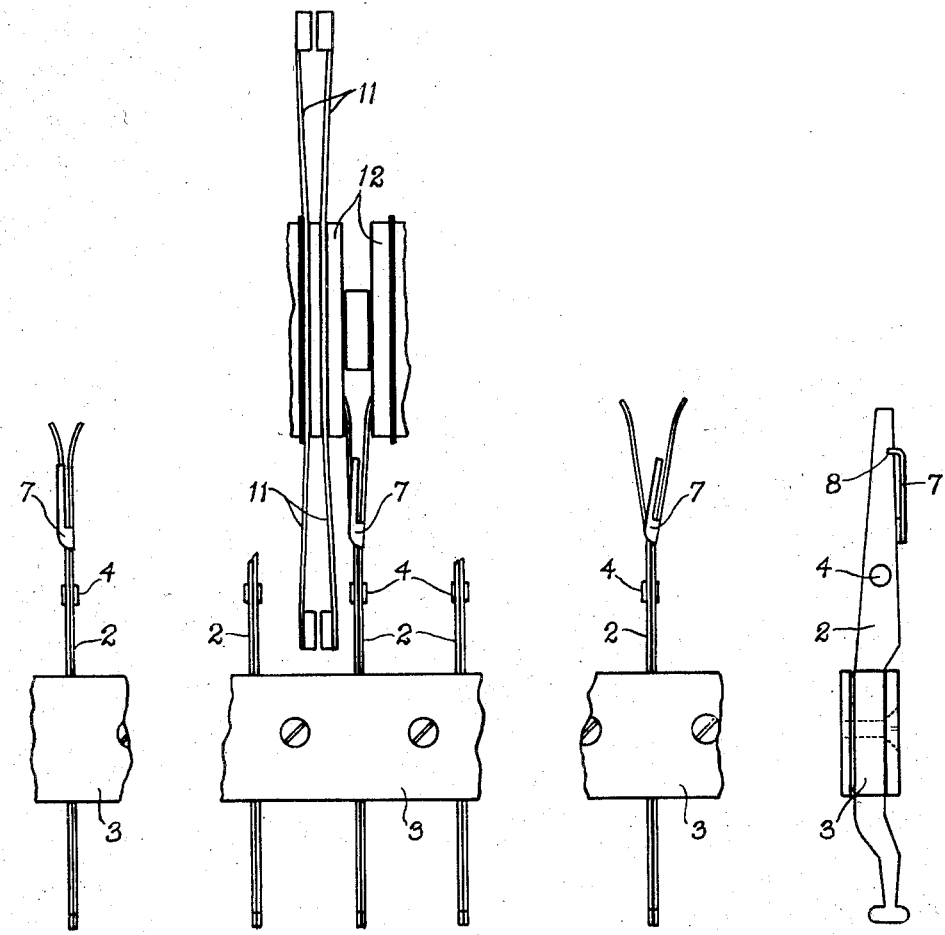

June 9, 1942.　　　　G. DEWAR　　　　2,285,694

AUTOMATIC SWITCH OF THE TYPE USED IN TELEPHONE SYSTEMS

Filed May 15, 1940

INVENTOR
GEORGE DEWAR
BY
ATTORNEY

Patented June 9, 1942

2,285,694

UNITED STATES PATENT OFFICE 2,285,694

AUTOMATIC SWITCH OF THE TYPE USED IN TELEPHONE SYSTEMS

George Dewar, Coventry, England, assignor to The General Electric Company Limited, London, England, a British company Application May 15, 1940, Serial No. 335,271
In Great Britain June 1, 1939

3 Claims. (Cl. 179—27.51)

The present invention relates to automatic rotary switches of the type used in telephone systems and the chief object of the invention is the provision of a form of current collecting brush gear which produces the minimum possible loading on the driving mechanism, and means whereby the said brush gear can be assembled with the maximum of ease. In switches of this type, it has previously been known to provide wipers for establishing contact with one of a number of fixed contacts, each wiper consisting of two halves tensioned together, the tips of the wipers engaging opposite sides of the fixed bank contacts. Each side of the wiper is in contact with a collecting ring of conducting material, and a fixed current collecting or feed brush passing between the two halves of the wiper establishes contact with the two conducting rings.

This construction suffers from a disadvantage that at the point when the wiper tips pass over the root of the feed brush, double loading is imposed on the driving mechanism, though assembly of this device is relatively simple. Each brush consists of two halves of springy conducting material, the tips being bent outwardly. The switch wipers are passed over the brushes during the assembly process, and rotation of the wipers squeezes the brush tips together, so that they pass inside the conducting rings and are tensioned normally into contact with them.

The present invention provides means for establishing contact with wipers of the type described, by means of current collecting rings and brushes also similar to those described but characterised in that the two collecting rings making contact with each wiper assembly are displaced axially from the centre of the wiper so that no part of the collecting brush has to pass between the wiper tips. Under such conditions, it is not easy to assemble a switch, since the brush tips, being sprung apart, have all to be compressed at the same time so as to pass their tips inside the current collecting rings. Means are therefore provided comprising a projection on one-half of a brush, this projection being flat and so constructed as to be flexible in a direction parallel to the plane of the brush. The tip of the projection is turned down and is so shaped as to catch the other half of the brush when the two halves, or tines, are pressed together. The two tines are then held together, and may be released by bending the projection upwardly away from the tines.

Reference should now be made to the accompanying drawing, in which Figures 1 and 3 show a brush in its closed and open positions, Figure 2 is a view of a brush establishing contact with a wiper assembly, and Figure 4 is a side view of a closed brush. From the drawing it will be seen that a number of brushes 2 are mounted in an insulating support 3 this support being carried or mounted upon a suitable part of the switch framework. Each brush is composed of two parts which are riveted together at 4, the ends being splayed apart so as to tension them, when in use, against the collector rings 12 which are displaced axially from the centre of the wiper 11.

In order to make assembly of the brush gear easy, a projection or catch 7 is formed on one of each pair of brush elements. This projection has a sloped end 8 which overlaps the other member of the brush as shown in Figure 4 when the two halves of the brush are pressed together, the projection being flexible in a direction parallel to the plane of the brush.

In assembling a switch, the halves of the brushes are pressed together, whereupon each projection 8 catches on the other half of the brush, so that the brush ends remain substantially closed (Figure 1). In this position, the brush assembly is placed on the switch and each of the projections is then raised, for example with pliers, so that its end 8 loses contact with the half of the brush which it had previously retained. The ends of the brush now expand so as to come into contact with the associated collecting rings 12, these rings being connected with the wipers 11 of the switch. Since the contact rings are off-set from the centre of the wiper, the tips of the latter do not have to pass over the root of the brush, with the result that the loading of the switch is almost uniform.

If the switch is to be dismantled for any purpose such as cleaning, the brush tips are pressed together and projection 8 then catches the corresponding half of the brush and holds the tines in position. The brush assembly can now be withdrawn and replaced without trouble. The fact that the tips of each brush are held together ensures that, even if potentials are still applied to the brushes during the dismantling process, no short-circuiting is produced, as the brush ends cannot spring apart and touch each other.

Although it has been stated above that the projection 7 is formed from the material of the brush 2, this need not, of course, necessarily be the case. It could be made as a separate detail, and riveted or welded in position, and the brush itself might be made of a single piece of material instead of two separate halves, the said material being bent double and sheared at the front end to form the two tips. The invention should be understood as covering these and other similar manufacturing alternatives.

I claim:

1. In a switch mechanism having wipers with a pair of opposed conducting rings connected to said wipers and a brush having a pair of tines on one end bent apart, each of said tines engaging one of said rings when the brush is inserted between the rings, the provision of a catch member forming a part of one of said tines and movable into a position to catch and hold said tines together, when they are compressed, to facilitate removal and insertion of the brush between the rings.

2. In a switch mechanism having a pair of conducting rings and a brush comprising a pair of conducting elements secured together and having the ends inserted between said rings and bent apart and tensioned to engage said rings, a projection formed as an integral part of one of said elements and having movement in one direction to hold said ends together when they are pressed together to aid in mounting the brush between the rings.

3. In a rotary switch mechanism having a shaft carrying pairs of wipers each having a set of conducting rings axially displaced from its pair of wipers on said shaft, and having a space between each set of rings and a brush of conducting material for each set of rings having one end inserted into the space between its rings carrying a pair of tines bent outward and tensioned to engage the inner sides of said rings, the provision of a projection on one of each pair of tines formed as an integral part thereof, said projection movable, when the tines are pressed together against their tension, to hold said tines together to facilitate insertion and removal thereof between said rings.

GEORGE DEWAR.